S. C. STORER & W. N. McCLURE.
CLOVER BUNCHING ATTACHMENT FOR MOWING MACHINES.
APPLICATION FILED MAR. 19, 1908.
No. 921,305.
Patented May 11, 1909.
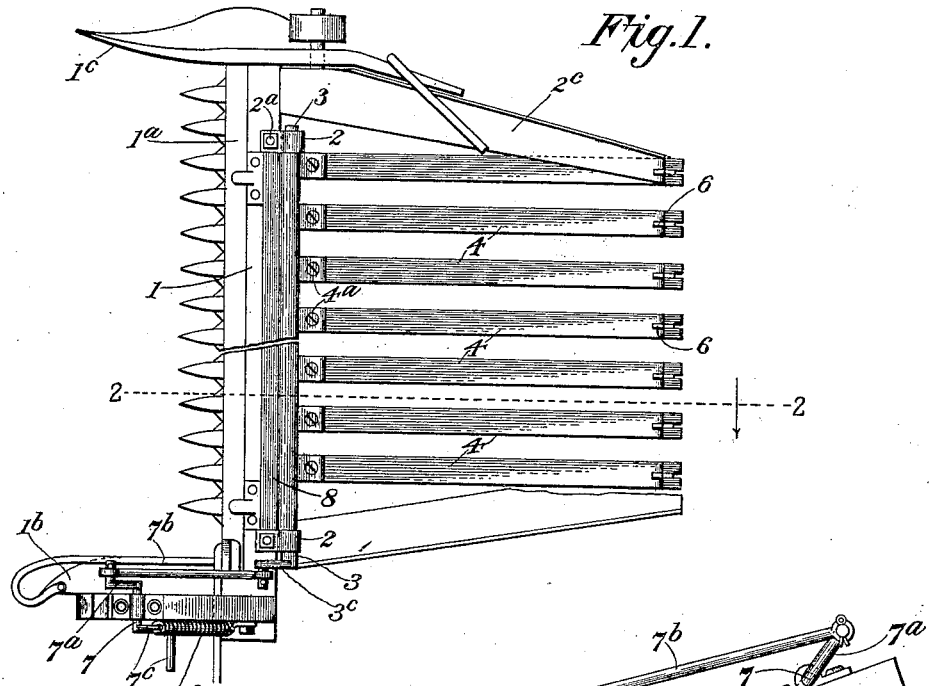
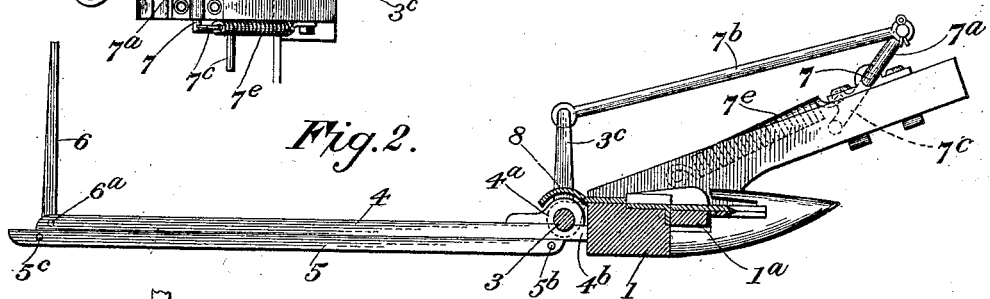
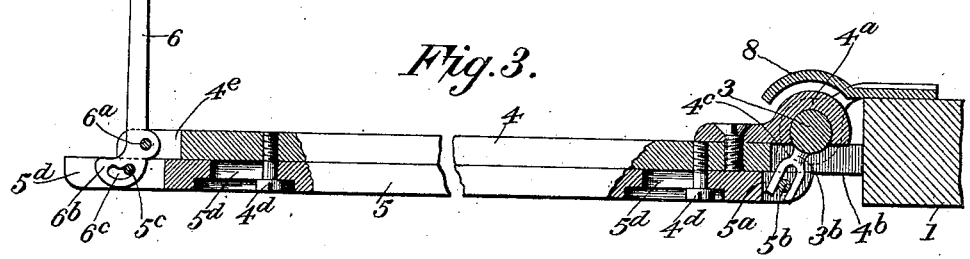
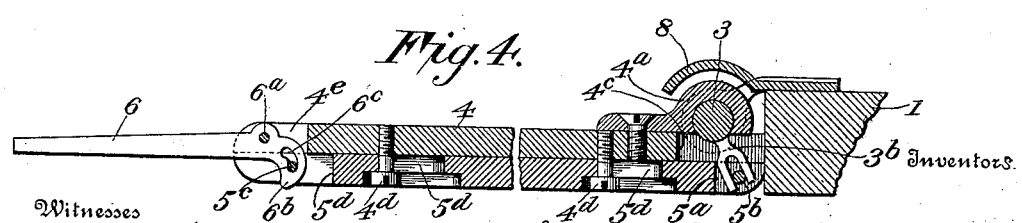

UNITED STATES PATENT OFFICE.

SAMUEL C. STORER AND WILLIAM N. McCLURE, OF HILLSBORO, OHIO.

CLOVER-BUNCHING ATTACHMENT FOR MOWING-MACHINES.

No. 921,305.  Specification of Letters Patent.  Patented May 11, 1909.

Application filed March 19, 1908. Serial No. 422,060.

*To all whom it may concern:*

Be it known that we, SAMUEL C. STORER and WILLIAM N. MCCLURE, both of Hillsboro, Highland county, Ohio, have invented certain new and useful Improvements in Clover-Bunching Attachments for Mowing-Machines; and we hereby declare that the following is a full, clear, and exact description thereof, reference being had to the accompanying drawings, which form part of this specification.

This invention is a novel clover bunching attachment for mowing machines. Its objects are to produce a buncher that will not choke, and will handle down, tangled clover or grass as well as the standing clover; which will be strong and durable; and can be easily attached to a cutter-bar; and will occupy very little vertical space.

The invention will be now explained with reference to the accompanying drawings which illustrate the present preferred practical embodiment thereof, as applied to a mower cutter-bar of well known construction.

In said drawings—Figure 1 is a plan view of the buncher attached to the cutter-bar of an ordinary mower or reaper, part of the buncher platform being broken away. Fig. 2 is an enlarged sectional view of the buncher platform taken on line 2—2, of Fig. 1, looking in the direction of the arrow, showing one of the slats and fingers in elevation with the finger raised. Fig. 3 is an enlarged longitudinal sectional view through Fig. 2. Fig. 4 is a view similar to Fig. 3, showing the fingers in lowered position.

In said drawings, 1 represents the cutter-bar of a mower, of any approved construction, carrying the sickle or knife $1^a$, which is located at the front side of the bar and operated in the usual manner. Said bar is provided with the customary shoe $1^b$, and the divider $1^c$.

To the rear side of the bar 1 are attached hangers 2, by means of bolts and nuts $2^a$, or other convenient manner. Said hangers support the ends of a rock-shaft 3, which lies close to and directly behind the rear edge of the cutter-bar 1, as shown. On this rock-shaft 3 are hung a series of parallel slats 4, which extend rearwardly from the bar, and are preferably loosely hung on the shaft by means of clip-castings $4^a$, which are bolted or screwed to the upper sides and forward ends of the slats 4, and embrace the upper side of the shaft 3, while the ends of the slats extend under the shaft, and slightly in front thereof, as shown at $4^b$, and are adapted to abut against the rear edge of the cutter-bar, and thus keep the slats substantially in the plane of the cutter-bar; although each slat is capable of swinging upwardly, in a vertical plane, on the shaft to a sufficient extent to allow them to ride easily over obstructions.

The slats 4 are kept in position upon the shaft by means of pins $3^b$ attached to the shaft at suitable intervals apart, said pins depending through slots $4^c$ in the forward ends of the slats as shown. Slidably fitted to the under side of each slat 4, is a bar 5, which may be connected with and suspended from the related slat, by means of headed bolts $4^d$, engaging corresponding slots $5^d$ in the bar.

The lower ends of pins $3^b$ enter slots $5^a$ in the forward ends of bars 5, and are engaged by pins $5^b$ transfixing the bars and engaging the slotted or bifurcated lower ends of pins $3^b$, as shown, so that when shaft 3 is rocked the bars 5 will be moved longitudinally of and under the slats 4.

To the rear ends of slats 4 are connected fingers 6; the lower ends of which enter slots $4^e$ in the slats, and are pivoted on pins $6^a$ transfixing the slats. Each finger has a downwardly and rearwardly extending portion $6^b$ adjacent the pivot $6^a$, in which portion is a curved cam slot $6^c$ engaged by a pin $5^c$ on the underlying bar 5. The depending portion $6^b$ of the finger entering a slot $5^d$ in the rear end of such bar 5. By means of this cam-slot connection we can throw the fingers from upright position to horizontal position with less than a quarter-turn of rock-shaft 3, and consequently a comparatively slight longitudinal movement of bars 5 will suffice to throw the fingers 6 from upright to horizontal position, or vice versa.

The rock-shaft 3 may be operated in any suitable manner. As shown it is provided on one end with a crank $3^c$ which is pivotally connected by a rod $7^b$ to an arm $7^a$ on a crank-shaft 7, mounted upon a convenient part of the mower frame, said shaft having an opposite crank $7^c$, which can be moved by the foot of the operator, against the action of a spring $7^e$ attached to the shaft and to a point on the mower frame; said spring being strong enough to normally hold the rock-shaft in the position assumed when the fingers are uppermost, or raised.

The devices for operating the shaft 3, may be varied to suit the constructor, or convenience of the operator, and make of machine to which the buncher is applied.

A metal guard-plate 8 may be fastened to the cutter-bar as shown, and projects over the rock-shaft 3, and forward ends of the slats, sufficiently to prevent any cut clover dropping down between the shaft and cutter-bar and interfering with the proper operation of the rock-shaft, or any of the connected parts.

It will be observed that all the working parts are practically covered, and all the joints open downwardly, so that there is no place for material and dust to accumulate and choke the working parts, which are virtually self-clearing.

In the drawings we have shown every slat as provided with a finger; but if they are placed close together it may be unnecessary to have every slat fingered; enough fingers being employed to insure the proper retention of the cut clover until the bunch is to be dropped.

The usual divider-board 1c is preferably lowered so that it will come close to or approximately rest upon the slats at the outer end of the cutter-bar, at its natural angle, and will direct the clover severed at the outer end of the sickle bar, properly onto the slats.

Our machine will not choke in operating, and will handle down and tangled clover, as we do not use any post at the outer end of sickle-bar to catch or hold long stems or straws that in down and tangled clover are always lapped over from the mower swath and tangled with the outer edge of the standing clover. About one-fourth turn or less of the rock-shaft is sufficient to change the fingers 6 from vertical to horizontal position; and a reverse movement of the rock-shaft restores the fingers to original position. The peculiar form of the fingers permits of their attachment to the ends of the slats in such manner as to leave no opening for foreign substances to collect and choke the operation of the fingers; nor is there any place at the front end of the slats that can be choked.

Another important feature of the invention is the thinness, vertically, of the slat platform, especially at the front end where it is connected with the sickle-bar. The complete buncher need be but little, if any, over one inch in thickness at the end attached to cutter-bar; this thinness of the buncher is a great advantage, in that it permits the cut off clover or grass to more readily find its way back to the fingers. The distance from the rear edge of the cutter-bar to the rock-shaft need not be over an inch, and thus the stubble beneath can quickly take hold of the cut clover and cause it to move back to the fingers where it is retained until a sufficient quantity has been accumulated to form a bunch; this keeps the sickle-bar clear so that newly cut clover does not accumulate thereon and push standing clover out of reach of the cutter.

Having described our invention what we claim as new and desire to secure by Letters Patent is:

1. In a bunching attachment for mowers, the combination of a rock-shaft, a series of rearwardly projecting slats, fingers pivoted to the said slats and provided with depending portions having cam-slots and reciprocating members connected with the rock-shaft, and engaging the cam-slots of the fingers.

2. In a buncher attachment for mowers, the combination of a rock-shaft adapted to be attached to the cutter-bar, a series of parallel slats, pins attached to the rock-shaft, fingers pivotally connected to the rear ends of said slats, and slidable bars underlying the slats and connected with the pins and engaging the cam-slots of the fingers, for the purpose specified.

3. In a bunching attachment for mowers, the combination of a rock-shaft, a series of rearwardly projecting slats, fingers pivoted to the rear ends of said slats and provided with depending portions having cam-slots and reciprocating bars suspended from the slats and connected with the rock-shaft, and engaging the cam-slots of the fingers.

4. In a buncher attachment for mowers, the combination of a rock-shaft adapted to be attached to the cutter-bar, a series of parallel slats hung on the rock-shaft, pins attached to the rock-shaft and preventing said slats moving along the rock-shaft, fingers pivotally connected to the rear ends of said slats, slidable bars underlying the slats and connected at their rear ends to the fingers and at their front ends to said pins.

5. In a buncher attachment for mowers, the combination of a rock-shaft adapted to be attached to the cutter-bar, a series of parallel slats hung on the rock-shaft, pins attached to the rock-shaft and preventing said slats moving along the rock-shaft, fingers pivotally connected to the rear ends of said slats, and having depending portions, slidable bars underlying the slats, and connected with the pins, and engaging the depending portions of the fingers, for the purpose specified.

6. In a clover bunching attachment, the combination of a cutter-bar, a rock-shaft attached to the rear edge thereof, a parallel series of slats loosely hung on said rock-shaft and slotted at both ends, pins attached to the rock-shaft and extending through the slotted front ends of said slats, fingers pivotally connected to the slotted rear ends of the slats, bars slidably connected to the under side of said slats, and pivotal connections between the forward ends of said bars and the pins on the rock shaft, pivotal connections between the rear ends of said bars and the fingers, and means for rocking said shaft.

7. In a clover bunching attachment for mowers, the combination of a cutter-bar, a rock-shaft attached to the rear edge thereof, a parallel series of slats loosely hung on said rock-shaft, and slotted at both ends, pins attached to the rock-shaft and extending through the slots in the front ends of said slats, fingers pivotally mounted in the slots in the rear ends of the slats and provided with depending portions having cam-slots, bars slidably connected to the under side of said slats, pivotal connections between the forward ends of said bars and the pins on the rock-shaft, pivotal connections between the rear ends of said bars and the cam-slots in the fingers, and means for rocking said shaft.

8. In a clover buncher attachment for mowers, the combination of a cutter-bar, a rock-shaft connected to the rear edge thereof, a series of independently movable slats hung on said rock-shaft, fingers pivoted to the rear ends of said slats, slidable bars under the slats, connections between the rock-shaft and the said slats, and pin and slot connections between the slats and fingers.

9. In a buncher attachment for mowers, the combination of a rock-shaft adapted to be attached to the cutter-bar, a series of independently movable parallel slats, slotted pins attached to the rock-shaft, fingers pivotally connected to the rear ends of said slats, slidable bars under the slats, connections between the forward ends of said bars and the slotted pins, and between the rear ends of said bars and the fingers.

10. In a buncher attachment for mowers, the combination of a rock-shaft adapted to be attached to the cutter-bar, a series of parallel slats hung on the rock-shaft, slats under the bars, pins attached to the rock-shaft and engaging the bars, fingers pivotally connected to the rear ends of said slats, said fingers having depending portions, and pin and slot connections between the rear ends of said bars, and the depending portions of the fingers, for the purpose specified.

11. In a clover buncher attachment for mowers, the combination of a cutter-bar, a rock-shaft connected to the rear edge thereof, a series of independently movable slats hung on the rock-shaft and slotted at their rear ends, fingers pivoted in the slotted rear ends of said slats, slidable bars underlying the slats, and connections between the forward end of said bars and the rock-shaft, and pin and cam slot connections between the rear ends of said bars and the fingers.

12. In a buncher attachment for mowers, the combination of a rock-shaft adapted to be attached to the cutter-bar, a series of parallel slats hung on said rock-shaft, slotted pins attached to the rock-shaft, fingers pivotally connected to the rear ends of said slats, and slidable bars underlying the slats and suspended therefrom and connected at their rear ends to the fingers by cam-like devices and at their forward ends to said slotted pins.

13. In a clover buncher attachment for mowers, the combination of a cutter-bar, a rock-shaft connected to the rear edge thereof, a series of independently movable slats loosely hung on said rock-shaft and capable of a limited vertical swing thereon, fingers pivoted to the rear ends of said slats and having cam portions, slidable bars underlying the slats, and connections between the forward ends of said bars and the rock-shaft, and between the rear ends of said bars and the cam portions of the fingers.

In testimony that we claim the foregoing as our own, we affix our signatures in presence of two witnesses.

SAMUEL C. STORER.
WILLIAM N. McCLURE.

In presence of—
NELLIE S. JOLLY,
IRVIN McD. SMITH.